United States Patent [19]
De Loor

[11] Patent Number: 5,654,817
[45] Date of Patent: Aug. 5, 1997

[54] SCANNING DEVICE

[75] Inventor: Ronny De Loor, Ghent, Belgium

[73] Assignee: Barco Graphics N.V., Ghent, Belgium

[21] Appl. No.: 595,917

[22] Filed: Feb. 6, 1996

[30] Foreign Application Priority Data

Feb. 22, 1995 [EP] European Pat. Off. ............ 95870015

[51] Int. Cl.$^6$ .................................................. G02B 26/08
[52] U.S. Cl. ......................... 359/201; 359/216; 250/235; 347/235
[58] Field of Search .......................... 359/17, 201, 202, 359/212, 216–219; 250/234–236; 347/233, 235, 237, 241, 243, 244; 358/296, 302, 474, 481

[56] References Cited

U.S. PATENT DOCUMENTS

| 4,971,413 | 11/1990 | Inoue . |
| 5,107,280 | 4/1992 | Ohashi et al. . |
| 5,281,812 | 1/1994 | Lee et al. . |

FOREIGN PATENT DOCUMENTS

| 542544 | 5/1993 | European Pat. Off. . |
| 4225946 | 8/1992 | Germany . |

*Primary Examiner*—James Phan

[57] ABSTRACT

A scanning device comprising a scanning member provided for pathwise scanning a medium along a scanning path by means of a scanning beam, said scanning member and said medium being mutually movable with respect to each other, characterized in that said scanning member comprises a plurality of N scanning modules, each $i^{th}$ ($1 \leq i \leq N$) scanning module being each time provided for scanning its assigned $i^{th}$ segment of said scanning path and an end point of a $j^{th}$ ($1 \leq j \leq N-1$) segment corresponds with a starting point of a $(j+1)^{th}$ segment, and wherein each $i^{th}$ scanning module comprises deviation determining means provided for determining on at least one position situated along said $i^{th}$ segment a cross-scan deviation between a predetermined scanning path and the path scanned by the scanning beam, said deviation determining means being connected with scanning beam steering means provided for determining upon receipt of said cross-scan deviation a first correction signal in such a manner -as to minimize said cross-scan deviation and for steering said scanning beam under control of said correction signal, and wherein said scanning beam steering means of a $k^{th}$ ($1 \leq k \leq N$) scanning module being provided for starting the scanning of its assigned $k^{th}$ segment on an assigned time $t_k$ within a scanning period $\Delta T$ for scanning the scanning path, the scanning beam steering means of each $m^{th}$ scanning module ($k \neq m$ and $1 \leq m \leq N$) being provided for starting the scanning of their assigned $m^{th}$ segment on time

$$t_m = t_k + \sum_{u=k}^{m-1} \Delta t_u$$

if m>k and $$t_m = t_k - \sum_{u=m}^{k-1} \Delta t_u$$

if m<k, $\Delta t_u$ being the time period for scanning the $u^{th}$ segment.

10 Claims, 10 Drawing Sheets

SCANNING DEVICE

The invention relates to a scanning device comprising a scanning member provided for pathwise scanning a medium along a scanning path by means of a scanning beam, said scanning member and said medium being mutually movable with respect to each other.

Such a scanning device is generally known in the printing and graphic art industry. The known scanning device is used either as a read or write device, or as both. The medium, generally formed by a picture, to be read or written is scanned pathwise by means of a scanning beam, generally a laser beam which scans the medium linewise. In order to scan the whole picture, the latter is generally moved with respect to the scanning beam which thus scans the picture line after line.

A drawback of the known scanning device is that the scanline width is limited to a distance which is less then 50 cm. Scanning over a large width implies either expensive techniques or poor resolution. Lever effects on the mirrors used for deflection of the laser beam have a negative effect on the scan quality. In order to avoid the latter, the scan width has been limited. Increasing the distance between the scanning member and the medium leads to an increase of the spot diameter and thus to a decrease of the resolution.

It is an object of the present invention to mitigate the drawbacks of the known scanning devices.

To this purpose a scanning device according to the present invention is characterized in that said scanning member comprises a plurality of N scanning modules, each $i^{th}$ ($1 \leq i \leq N$) scanning module being each time provided for scanning its assigned $i^{th}$ segment of said scanning path and wherein an end point of a $j^{th}$ ($1 \leq j \leq N-1$) segment corresponds with a starting point of a $(j+1)^{th}$ segment, and wherein each $i^{th}$ scanning module comprises deviation determining means provided for determining on at least one position situated along said $i^{th}$ segment a cross-scan deviation between a predetermined scanning path and the path scanned by the scanning beam, said deviation determining means being connected with scanning beam steering means provided for determining upon receipt of said cross-scan deviation a first correction signal in such a manner as to minimize said cross-scan deviation and for steering said scanning beam under control of said correction signal, and wherein said scanning beam steering means of a $k^{th}$ ($1 \leq k \leq N$) scanning module being provided for starting the scanning of its assigned $k^{th}$ segment on an assigned time $t_k$ within a scanning period $\Delta T$ for scanning the scanning path, the scanning beam steering means of each $m^{th}$ scanning module ($k \neq m$ and $1 \leq m \leq N$) being provided for starting the scanning of their assigned $m^{th}$ segment on time $$t_m = t_k + \sum_{u=k}^{m-1} \Delta t_u$$

if m>k and $$t_m = t_k - \sum_{u=m}^{k-1} \Delta t_u$$

if m<k, $\Delta t_u$ being the time period for scanning the $u^{th}$ segment. By providing N scanning modules which each scan their assigned segment of the scanning path, the width of the scanning path can be substantially increased. The determination of the cross-scan deviation for each segment enables to steer the scanning beam of each scanning module in order to minimize the cross-scan deviation and thus to substantially reduce scanning error effects. The fact that the times $t_m$ are determined in the described manner causes that they are linked to master time $t_k$ and that there is a well defined relationship among them. This relationship causes that the scanning of an $(i+1)^{th}$ segment starts at a time $t_{(i+1)}$ which is $\Delta t_i$ seconds later than time $t_i$ at which the scanning of segment i has started. Since $\Delta t_i$ is the time period needed for scanning segment i, the scanning of segment (i+1) starts when the scanning of segment i just ended. In such a manner there is no scanning beam jump between successive segments. Indeed due to the relative movement of the medium and the scanning member it is necessary that the segments be subsequently scanned. If the path was scanned without time relationship between the different modules, the relative movement would cause scanning jumps between the successive segments. By assigning a time $t_k$ to a $k^{th}$ segment, the $k^{th}$ scanning module becomes the master among the N modules and the remaining N–1 modules are slaved to that $k^{th}$ scanning module. The master-slave relation enables to adequately synchronise the different scanning modules with each other in order to successively scan the different segments.

The gist of the present invention is to have divided the scanning path into adjacent segments which are successively scanned, each by their assigned scanning module. The men skilled in the art of scanning would normally not consider such a division because this would lead to butting problems between successive segments. Moiré effects would then be observed in the scanned picture. By applying as well cross-scan correction as successive scanning of the subsequent segments, the latter are correctly linked together to form a continuous scanned path.

A first preferred embodiment of a scanning device according to the present invention is characterized in that said deviation determining means are provided for determining said cross-scan deviation on a first respectively a second position situated at a starting respectively at an end of said $i^{th}$ segment. This enables a more reliable cross-scan correction. Thereupon, when the medium is scanned line-wise, the determination of the cross-scan deviation at starting and end points enables to shift and rotate the segment towards a nominal segment.

A second preferred embodiment of a scanning device according to the present invention is characterized in that said deviation determining means are situated on a location situated outside a zone crossed by said scanning beam upon scanning the $i^{th}$ segment, said $i^{th}$ scanning module being provided to steer said scanning beam in order to reach said location. In such a manner the deviation determining means do not obstruct the passage of the scan beam.

A third preferred embodiment of a scanning device according to the present invention is characterized in that each $i^{th}$ scanning module further comprises a detector unit provided for detecting when said scanning beam has reached said starting point of the $i^{th}$ segment and for generating a first control pulse indicating the latter, said detector unit being provided for verifying if said first control pulse coincides with said assigned time $t_i$ assigned to segment i and for determining a second correction signal upon establishing that said first control pulse does not coincide with said assigned time $t_i$, said scanning beam steering means being connected with said detector unit and further provided for steering said scanning beam under control of said second correction signal in such a manner that said first control pulse and said assigned time $t_i$ coincides. The presence of detector units enables to detect and measure in-scan deviations between the assigned nominal scan segment and the actual scanned segment. Such in-scan deviations are for example caused by fluctuations in the rotational speed of the different motors driving the polygon of the different scanning units. Upon determining the second correction signal it becomes possible to adjust the steering of the scanning beam in such a manner that the scanning beam reaches the detector unit at the requested time within the scanning period and thus scan the segment at the assigned time.

Preferably said detector unit is situated on a further location situated outside a zone crossed by said scanning beam upon scanning the $i^{th}$ segment, said $i^{th}$ scanning module being provided to steer said scanning beam in order to reach said location. In such a manner the presence of the detector unit does not disturb the scanning beam during the scanning of the segment.

A fourth preferred embodiment of a scanning device according to the present invention is characterized in that said detector unit of each $i^{th}$ scanning module is also provided for generating a second control pulse when said scanning beam of said $i^{th}$ scanning module has reached the end point of its assigned $i^{th}$ segment, said detector unit being further provided for determining $\Delta t_{u=i}$ upon determining the time difference between said first and second control pulse. The time needed for scanning each segment is thus accurately determined, which also enables to correctly slave the different scanning modules to the master module.

Preferably said detector unit comprises a detector element provided for detecting when the scanning beams of said $i^{th}$ and $(i+1)^{th}$ scanning modules have reached the end point and the starting point, respectively, of said $i^{th}$ and $(i+1)^{th}$ segments. A single detector element can thus be used for two subsequent scanning modules.

A fifth preferred embodiment of a scanning device according to the present invention is characterized in that said deviation determining means are further provided for determining an image plane distance deviation between an actual scanning path and a nominal scanning path on said medium, said scanning beam steering means being further provided for determining upon receipt of said distance deviation a third correction signal and for steering said scanning beam under control of said third correction signal in such a manner as to compensate for said distance deviation. Scanning errors due to small variations in the flatness of the medium can thus be corrected.

Preferably said scanning beam steering means comprises an acousto-optical deflector provided for imposing a deflection on said scanning beam under control of said correction signal. An accurate and reliable correction is thus obtained. Thereupon the acousto-optical deflector can be used as well for the data modulation as for correction purposes.

The invention will now be described in more details with respect to the annexed drawings wherein:

FIG. 11b shows the phase relation between two of the scanning modules shown in FIG. 11a.

In the different figures a same reference number has been assigned to a same or analogous element.

Figure 1:
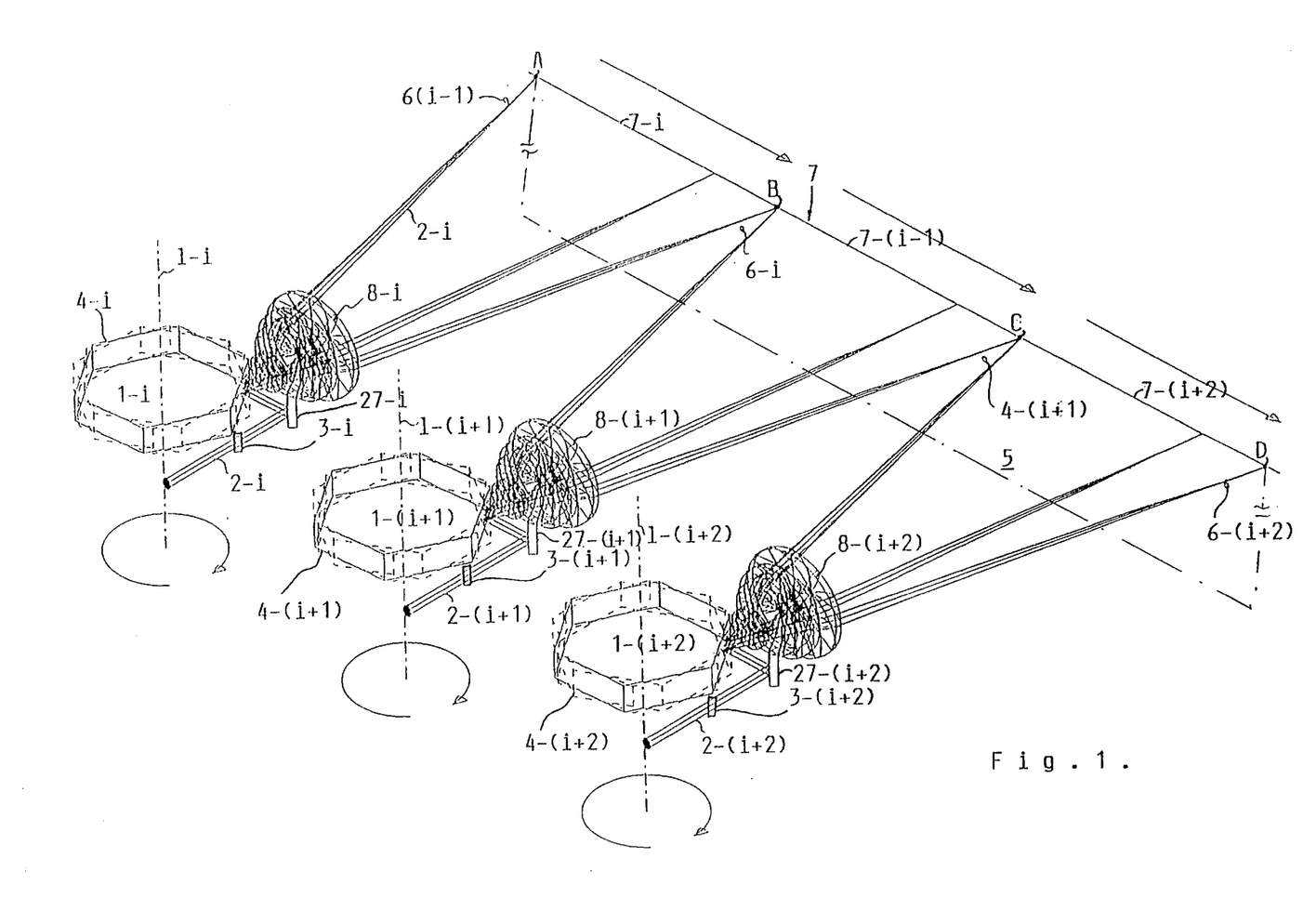
FIG. 1 shows an overall view of an example of a scanning device according to the invention.

The scanning device according to the present invention comprises $N(N \geq 2)$ scanning modules of which three $((1-i)$, $(1-(i+1))$, $(1-(i+2))$, wherein $1 \leq i \leq N$ are shown in the example illustrated in FIG. 1. The number N of scanning modules will depend on the width of the medium 5 to be scanned. Each module 1-$i$ scans a segment 7-$i$ of the scan path 7, which segment has a width preferably situated between 25 and 50 cm. The scanning member illustrated in FIG. 1 is thus provided to scan a medium over a width of 75 to 125 cm, which is substantially larger than the generally used path width of 50 cm. The device is particularly suitable for high resolution scanning, i.e. >100 lines per mm.

In order to scan the medium 5 over its whole length the scanning member and the medium are mutually movable with respect to each other. Usually the medium is moved in a direction perpendicular to the scan path 7 when a flat bed type scanning device or a capstan medium transport is considered. However, the medium to be scanned could also be mounted on a rotary drum. By moving the medium with respect to the scanning member, the medium is scanned pathwise over its whole length. The scanning path is preferably formed by a straight line, however other geometries could also be considered.

As shown in FIG. 1, the scanning path 7 is divided in a plurality of segments 7-$i$, 7-$(i+1)$, 7-$(i+2)$ and a dedicated scanning module 1-$i$, 1-$(i+1)$, 1-$(i+2)$ is assigned to each segment. For manufacturing purposes the different segments preferably have a same scan length. However, segments of different length could also be considered. It is however important that the end point of each $j^{th}$ $(1 \leq j \leq N-1)$ segment correspond with the starting point of a subsequent $(j+1)^{th}$ segment, otherwise the scanning path would not be continuously scanned.

Each scanning module comprises a scanning unit 4-$i$, 4-$(i+1)$, 4-$(i+2)$ for example formed by a hologram or a rotating polygon provided with mirrors. The scanning modules further comprise a scanning beam source, for example formed by a laser producing a light beam 2-$i$, 2-$(i+1)$, 2-$(i+2)$ which is oriented towards a cross-scan beam steering unit 3-$i$, 3-$(i+1)$, 3-$(i+2)$ which is part of the scanning beam steering means. The cross-scan beam steering unit is for example formed be an acousto-optical deflector, an electro-optical deflector or by a pivoting mirror preferably mounted on a piezo-electrical crystal. Electro- or acousto-optical deflectors have the advantage that they are also provided for modulating the beam in accordance with the data to be written on the medium. The cross-scan beam steering unit controls the height of the incident scanning beam with respect to the nominal scan path 7. The beam is deflected towards the scanning unit 4, by means of deflection mirror 27. The scanning unit 4 is rotatable around an axis 1. The rotation of the scanning unit 4 causes the scanning beam to scan its designated segment. The beam reflected by the polygon is focused by means of a lens unit 8-$i$, 8-$(i+1)$, 8-(i+2) in order to obtain a small and sharp spot on the scan path. The lens unit is preferably an f-theta lens because such a lens causes a linear relationship between the location of the spot in the segment and the rotation angle of the polygon-face with respect to the rotation axis.

Figure 2:
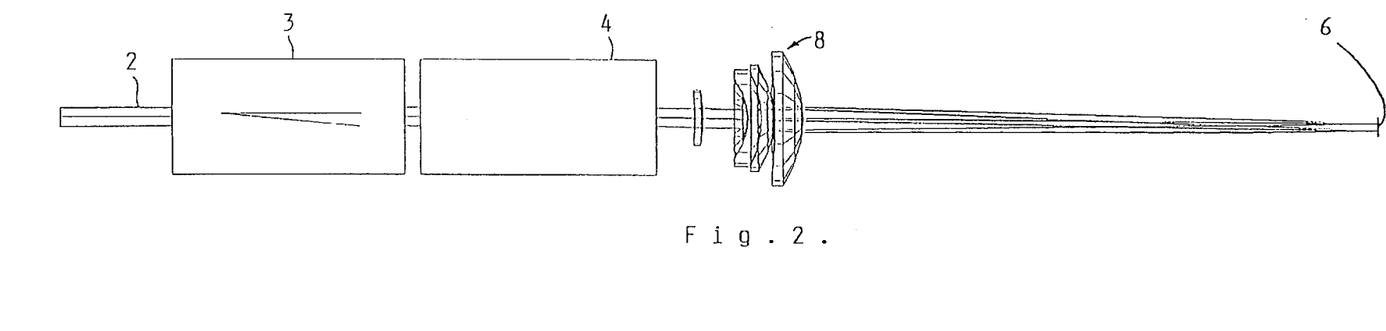
FIG. 2 shows an embodiment of a scanning beam steering means as a part of a scanning module.

The alignment of the scanning beam with respect to the scanning path is realised by means of cross-scan beam steering unit 3 as illustrated in FIG. 2. The pivoting of the mirror or the change in the acousto-optical frequency causes the outgoing scanning beam to deflect with respect to the incoming scanning beam. This deflection will then cause the scan beam to shift thus enabling an alignment of the scanning beam with respect to the scanning path 7 on the medium 5.

Figure 3:
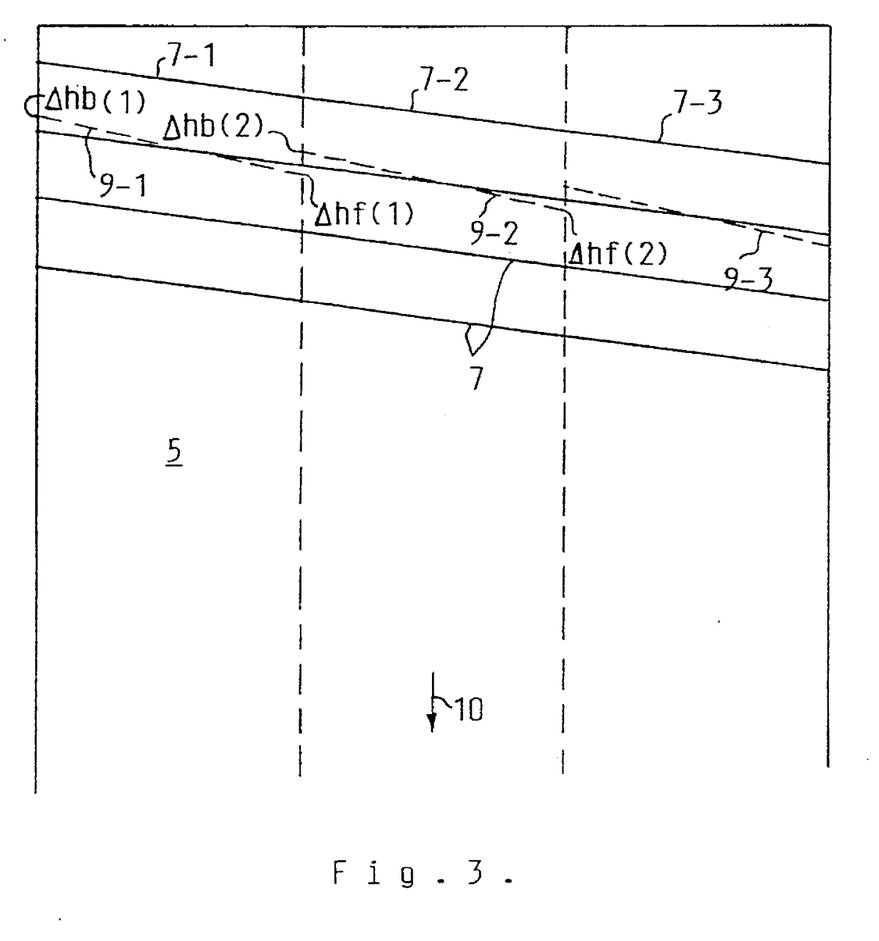
FIG. 3 illustrates the cross-scan deviation.

Due to the relative movement of the medium and the scanning member, the scanning path is not perpendicular but inclined in the opposite direction of the movement of the medium indicated by arrow 10 in FIG. 3. This has substantial consequences for the division into N segments of the scan path. Since each scanning member only scans its assigned segment care must be taken that cross-scan deviations and butting errors do not introduce perturbations such as a Moiré effect or a banding effect into the scanning result and thus deteriorate the image quality. Partitioning of the scan path is potentially harmful for the image quality so that measures must be taken to avoid this problem.

Figure 8:
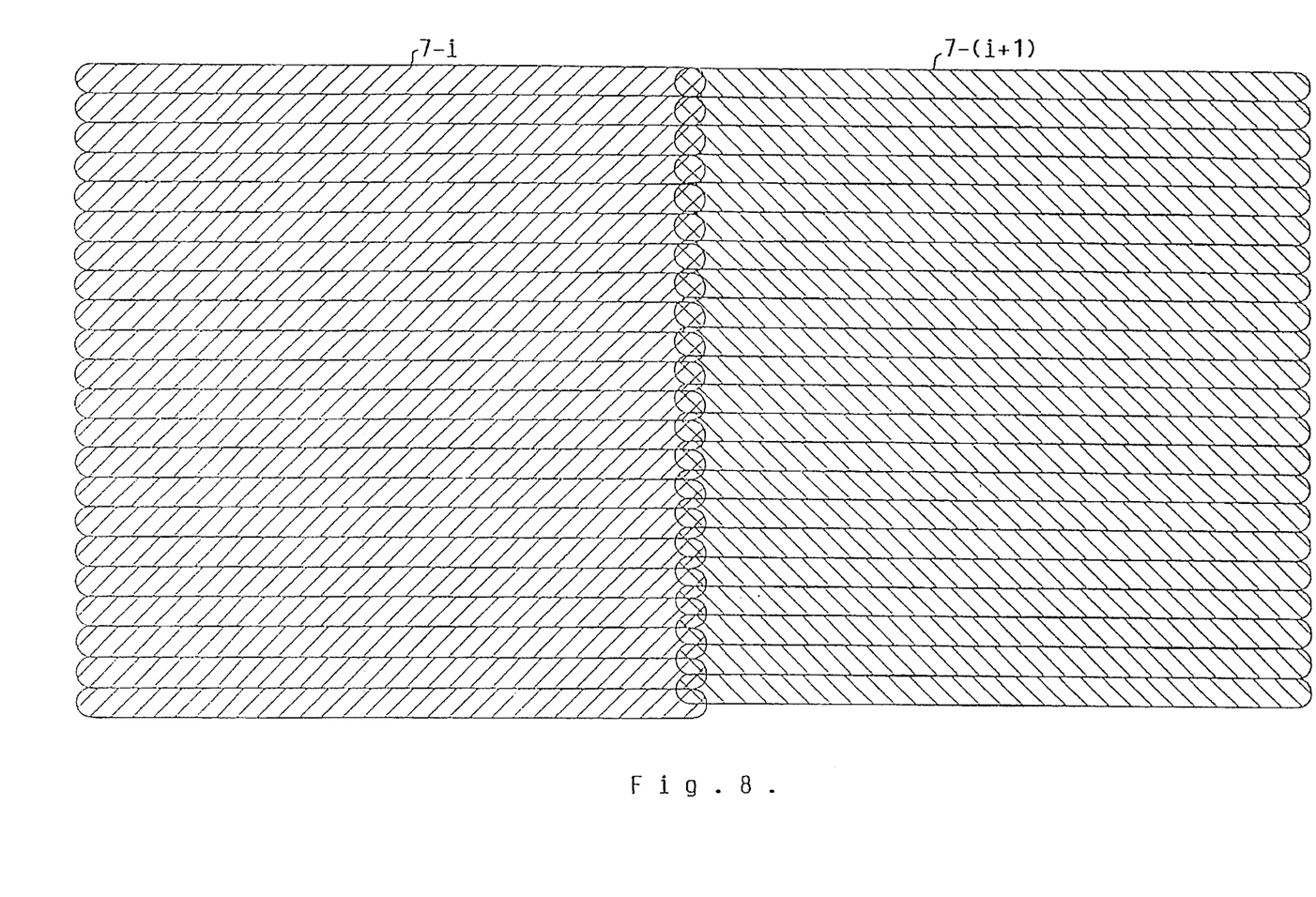
FIG. 8 illustrates the consequences due to cross-scan butting errors.

The effect of a cross-scan deviation is illustrated in FIG. 3. The full inclined line 7 shows the nominal scanning path to be obtained when all the scanning beams of the different modules are accurately aligned both in in-scan- and cross-scan direction with each other. However if one or more modules are not accurately aligned, the actually scanned segment 9-1, 9-2, 9-3 will deviate from the nominal scanning path segment 7-1, 7-2, thus resulting in a cross-scan deviation $\Delta hb$ and $\Delta hf$ at the starting and end points of the segment. At the take-over point between two successive segments, the total cross-scan deviation is than $\Delta h=\Delta hf(i)+\Delta hb(i+1)$. Moreover, because the polygon rotating speed of the different modules could be slightly different, the value of $\Delta h$ will change during the top to bottom scan time as shown in FIG. 8. The latter would make the scanning result unacceptable if no measures were taken. Cross-scan and in-scan deviations are further caused by thermal deformation in the optics and mechanics of the device.

In order to compensate cross-scan deviation, the scanning device according to the present invention comprises deviation determining means which are provided for determining at at least one position of the segment, the cross-scan deviation with respect to the nominal scanning path. The deviation determining means comprises for each scanning module at least one detection unit 6. If the detection unit is provided for detecting the scanning beam, it must be mounted in such a manner that it does not obstruct the scanning beam upon scanning the medium. Instead of using a detection unit which detects the scanning beam, it would also be possible to superimpose light of a different wavelength on the scanning beam and detect that different wavelength which would not influence the scanning.

The cross-scan deviation can in principle be measured at every point within the segment. However, preference is given to a measurement at the starting and end points of the segment. Correction can then easily be determined by interpolation. The scanning beam will then be shifted and/or rotated by means of the steering unit in order to force the actual beam on to the nominal path.

In the embodiment shown in FIG. 1, N+1 detection units 6 are provided. Indeed scanning module 1-1 comprises a Start Of Scan (SOS) detector element 6-1 and an End Of Scan (EOS) detector element 6-2 which also acts as a SOS detector element for scanning module 1-2. However, each scanning module can of course have its own SOS and EOS detector unit, but a cost reduction and quality enhancement are obtained by using N+1 detector units instead of 2N. The detector units are placed in front of the medium. However they could also be coupled to the medium, for example when light of a different wave length than the one used for scanning purposes is used.

Figure 4:
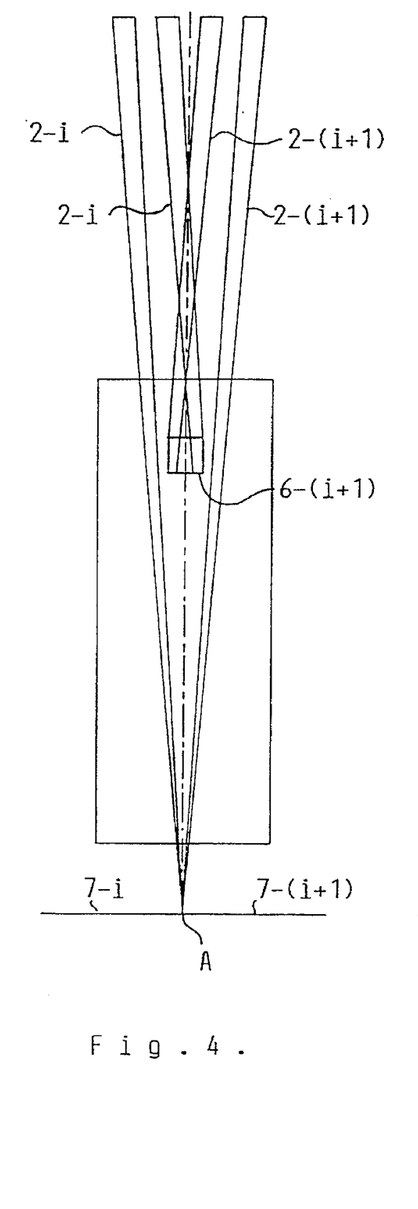
FIG. 4 shows a front view of an example of the set-up of a detector unit and the path crossed by the scanning beam in the neighbourhood of the detector unit.

FIG. 4 illustrates the position of the detector unit 6 with respect to the scanning beam for an embodiment where the scanning light is also used for detection purposes. The detector unit is placed between two scan heads in such a manner that a same detector unit can detect and measure the cross-scan deviation at the end of scanning beam 2-$i$ and at the beginning of scanning beam 2-($i$+1), scanning segment 7-$i$ and 7-($i$+1). The detector unit 6 is situated at a distance of at least 0.5 cm ahead from the medium in order not to disturb the scanning.

In the device according to the present invention, the scanning modules are arranged in such a manner that the outgoing scan beam covers a path which is a little bit longer than the length of its assigned segment. When beam 2-$i$ of scanning module 1-$i$ has reached the end point A (FIG. 4) of the segment 7-$i$, scanning beam 2-($i$+1) of scanning module 2-($i$+1) must start the scanning of the segment 7-($i$+1) in order to avoid butting errors as already described. After having reached point A, scanning beam 2-$i$ continues to travel due to the construction of the module 1-$i$ and reaches immediately the detector unit 6-($i$+1) as illustrated in FIG. 4. Detector 6-($i$+1) now detects that scanning beam 2-$i$ has reached its end point. Analogously, scanning module 1-($i$+1) is provided to generate a scanning beam 2-($i$+1) which reaches detector unit 6-($i$+1) before reaching point A, the starting point of scanning segment 7-($i$+1). Detector unit 6-($i$+1) thus also detects that scanning beam 2-($i$+1) is ready to start its scanning.

Figure 6:
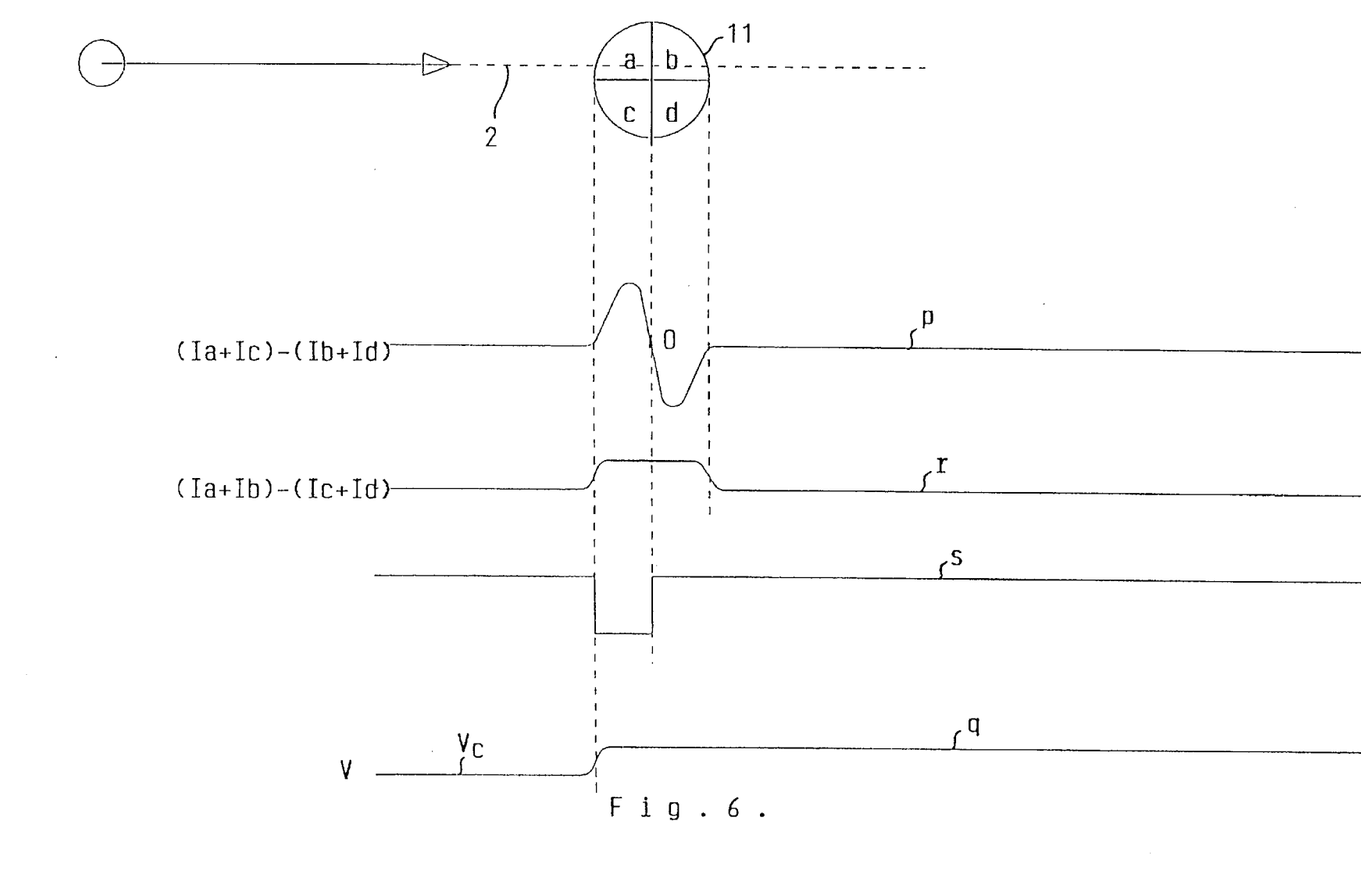
FIG. 6 illustrates the operation of an embodiment of the deviation determining means.

In order to measure the cross-scan deviation, detector unit 6 preferably comprises a 4 quadrant diode 11 as illustrated in FIG. 6. A 4 quadrant diode enables to determine the cross-scan deviation value of the incident beam by subtracting the bottom photodiode currents (Ic+Id) from the top (Ia+Ib) currents. Since the detector is illuminated by a moving spot, the light spot will be at the middle of the detector when the right (Ia+Ic) and left (Ib+ic) photodiode currents are equal.

Suppose now, with reference to FIG. 6, that the beam 2 crosses the quadrants a and b of photodiode 11. Photodiode current Ic and Id will be equal to 0 and Ia≠0, Ib≠0. The result of (Ia+Ic)−(Ib+Id) is shown in FIG. 6 by curve p, while curve r shows the result (Ia+Ib)−(ic+Id). The curve p is symmetrical with respect to point 0 while curve r shows a positive value over the whole length of the diode. The result thus clearly indicates that scan beam 2 is offset with respect to the nominal path determined by the central line of the diode 11 (positive value of (Ia+Ib)−(Ic+Id) and extends over a straight line (symmetrical). The cross-scan deviation can thus be determined by the measurement result. In the present example the curve q in FIG. 6 illustrates the cross-scan deviation signal such as sampled by the sample pulse s. The latter sample pulse being generated by the beam passing quadrant a or c of diode 11. The sampled value $V_c$ corresponds to the deviation of $\Delta hb$ at the start of the scanned segment. The sampled deviation value $\Delta hb$ will then be supplied to the scanning beam steering means 3 in order to compensate for the cross-scan deviation and minimize the latter.

FIG. 6 illustrates the determination of the cross-scan deviation at the starting point of the segment to be scanned. The cross-scan deviation at the end point of the segment is determined in an analogous manner by using also a 4 quadrant diode for the detector unit. A deviation value $\Delta hf$ will then be determined for the cross-scan deviation at the end of the segment.

Figure 7:
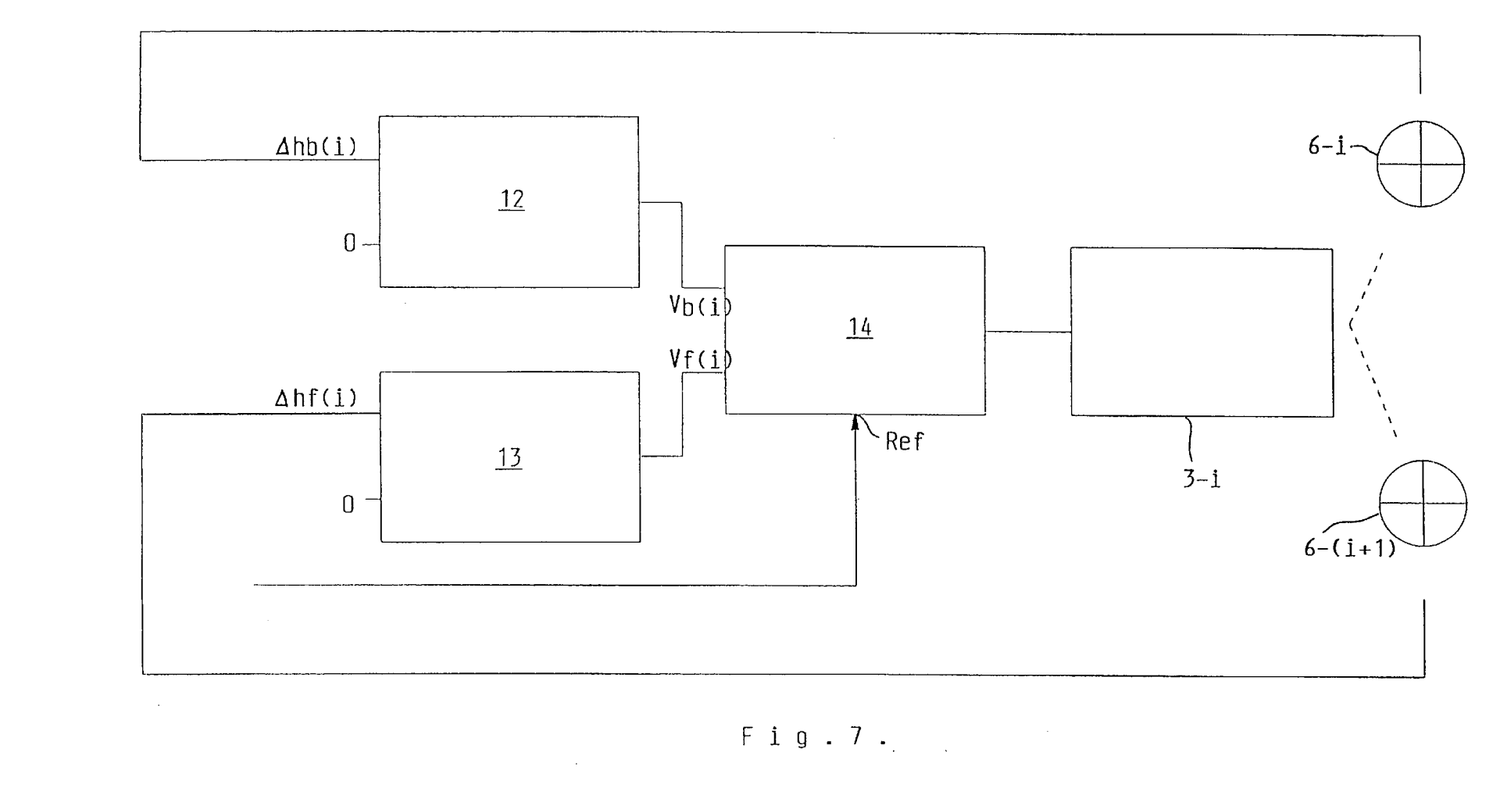
FIG. 7 shows a block scheme of an embodiment of a control circuit as a component of the beam steering means.

FIG. 7 shows a block scheme of an embodiment of a control circuit as a component of the beam steering means. The deviation value $\Delta hb(i)$ respectively $\Delta hf(i)$ such as determined by detector 6-i respectively 6-(i+1) is supplied to a first 12 respectively a second 13 PID (Proportional Integral Derivative) controller. The PID controller generates the control voltages $V_{b(i)}$, $V_{f(i)}$ on the basis of the values $\Delta hb(i)$ and $\Delta hf(i)$. $V_{b(i)}$ respectively $V_{f(i)}$ represent the cross-scan control voltage at the starting respectively the end points of segment 7-i. The output of each PID controller is connected to a respective input of an interpolator 14 which receives an in-segment position signal at a control input indicating the spot position along the considered segment. The interpolator then interpolates linearly between the control voltages $V_{b(i)}$ and $V_{f(i)}$ in order to form an interpolated voltage which forms a first correction signal. The interpolated voltage is supplied to the beam steering means 3-i. Under control of this interpolated voltage forming the first correction signal, the beam steering means will control either the acousto-optical cell, or let the mirror pivot in order to reorient the beam and minimize the cross-scan deviation between the actual path and the nominal path.

The cross-scan position of the laser spot is aligned for example by changing the input angle of the incident beam. The angle of the steering means is controlled by the cross-scan control loop, operating by means of an algorithm which enables to minimize the cross-scan error at the SOS and EOS detector units. During the fly time of the spot, the correction angle is integrated between the correction values.

Figure 5:
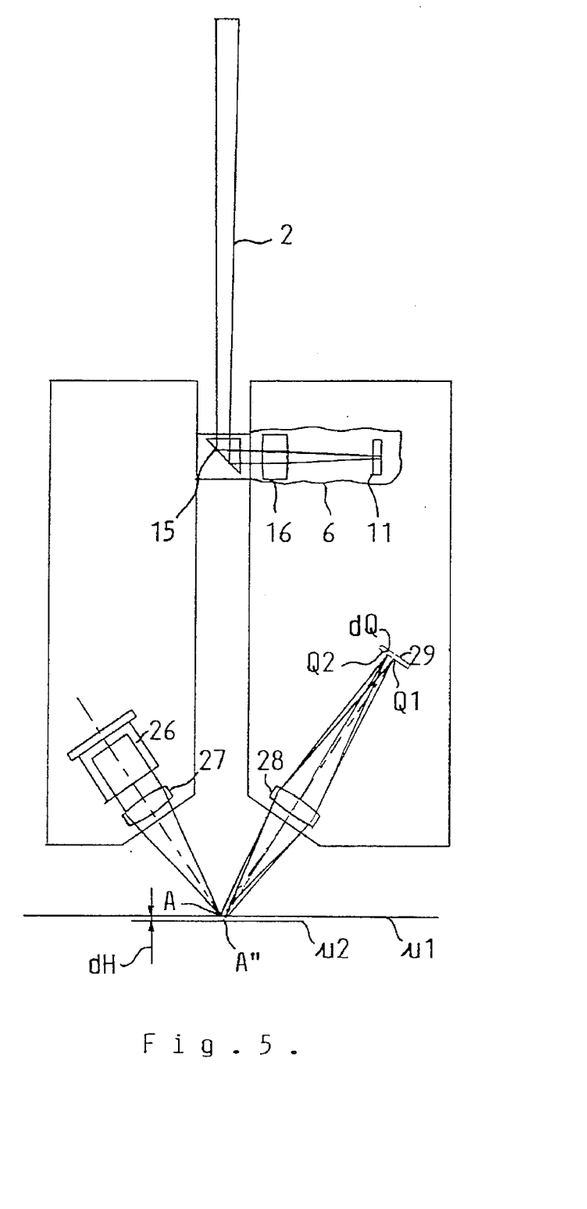
FIG. 5 shows a lateral view of an example of the set-up of a detector unit and the path crossed by the scanning beam in the neighbourhood of the detector unit.

In order to prevent that the 4 quadrant diode obstructs the scanning beam, the detection unit 6 preferably comprises a prism 15 which deflects the incident beam 2 over substantially 90° as illustrated in FIG. 5. The deflected beam is then focused by means of a lens system 16. This lens system is necessary in order to orient the beams of two subsequent scanning modules on the detector, which is offset with respect to the picture plane. The lens causes the beams to be imaged on the diode 11 in order to enable a correct determination of the cross-scan deviation.

By applying cross-scan correction, cross-scan errors can be kept lower than 0.1 μm, thus enabling to avoid Moiré or banding effects in high resolution scanning.

Figure 9:
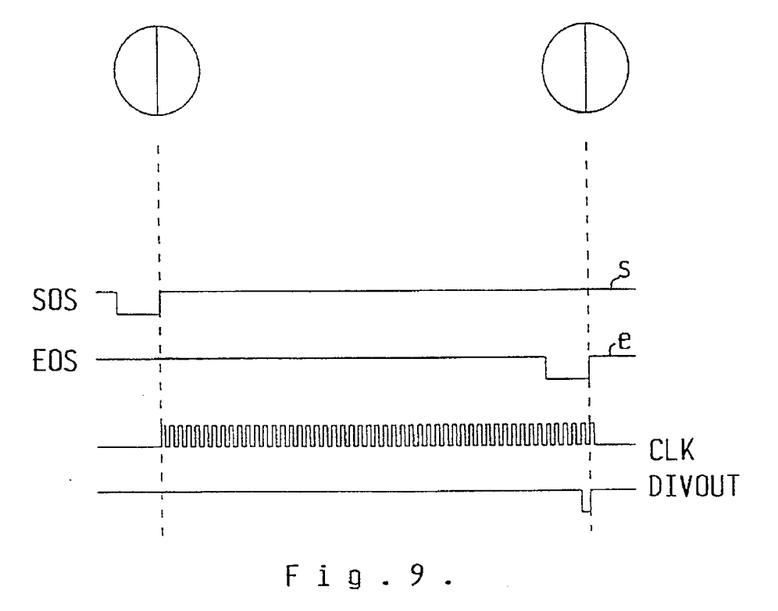
FIG. 9 illustrates the control pulses for controlling the operation of the scanning beam steering means.

In order to avoid butting errors between successive segments, it is also necessary to have the end of the scanning of segment 7-i substantially coincide with the beginning of the scanning of the segment 7-(i+1), taking into account the relative movement of scanning beam and medium, as already mentioned. Synchronisation of the different scanning modules is thus necessary in order to avoid in-scan deviations as shown in FIG. 8. This synchronisation is realised by using the detector units 6. When the scanning beam starts the scanning of its assigned segment, the light is incident on the detector unit 6, thus causing a first control pulse to be generated as shown by signal s in FIGS. 6 and 9. A second control pulse is generated when the scanning beam has reached the end point of its assigned segment, signal e as illustrated in FIG. 9.

In the embodiment shown in FIG. 1, the same detector unit is used for detecting the beginning or the end of the scanning as well as the cross-scan deviation. Of course separate detectors could be used, but it is more economical to use the same one. In particular when 4 quadrant diode is used, the generated first and second pulse are such that the down-going edge of the pulse coincide with the moment at which the light reaches one of the quadrants a or c and the up-going edge with the moment at which the spot crosses the separation between the quadrants a and b or c and d.

The synchronisation of two successive scanning modules is obtained by having the $(i+1)^{th}$ module start its scanning when the $i^{th}$ module just ended its scanning. Shutting off the $i^{th}$ beam and putting on the $(i+1)^{th}$ beam at the same moment provides an error free take-over point.

In order to provide this error free take-over point the moment in time, within the scanning period $\Delta T$ for scanning the whole path 7, at which each scanning module starts to scan its assigned segment has to be accurately determined. Among the N segments to be scanned one segment k End its assigned scanning module are selected, for example the first segment and module k=1, to act as a master with respect to the other N−1 segments and modules. The choice k=1 is only given by way of example as any segment and assigned segment could be used for acting as a master.

The scanning beam steering means of master scanning module k are now provided for focusing scanning beam 2-k on the starting point of segment k at the assigned time $t_k$ within scanning period $\Delta T$. Scanning module k needs a time period $\Delta t_k$ to scan segment k. In the example where k=1, the scanning module 1-1 starts the scanning of segment 7-1 at time $t_1$ and reaches the end of segment 7-1 at time $t_1$ and reaches the end of segment 7-1 at time $t_1+\Delta t_1$. In order to obtain an error free take-over point, scanning module 1-2 must start the scanning of segment 7-2 at time $t_2=t_1+\Delta t_1$. For each of N−1 remaining scanning modules an assigned time $t_m$ (m≠k and $1 \leq m \leq N$) is now determined on the basis of time $t_k$. For the scanning modules following master module k, i.e. those m modules for which m>k is determined by $$t_m = t_k + \sum_{u=k}^{m-1} \Delta t_u$$

If master scanning module k is not the first scanning module, i.e. k≠1, then the assigned time $t_m$ for the scanning modules m<k is determined by $$t_m = t_k - \sum_{u=m}^{k-1} \Delta t_u$$

The m slave scanning modules are thus synchronized with master scanning module k. In such a manner each $m^{th}$ scanning module starts the scanning of its assigned segment m at the moment at which the scanning of the preceding segment m−1 just finishes.

The light spot of beam 2-(m−1) and 2-m thus momentary overlap at time $t_m$. This momentary spot overlap is for example realized by synchronising the speed at which the motors of the rotating polygons rotate. Synchronisation of the polygon rotation speeds provide for a constant step error. Phase synchronisation of the head rotation angles provides in-scan spatial synchronisation of the scanning spots leading to a zero step error. This is understood by realising that there is a fixed relationship between polygon mirror angle and in-scan spot position. The phase difference set point between the polygons is determined by the time $\Delta t_u$ it takes the spot to move from the starting to the end points of the segment.

In order to obtain this synchronisation, the pixel clock oscillator is phase-locked to the first control pulse as shown by the clock signal CLK illustrated in FIG. 9. This enables an exact phase relation between the starting point detection and the position of the first scanned pixel. The second control pulse (e, FIG. 9) is used to tune the pixel clock frequency so that the distance crossed between the first and second control pulse is divided into a constant number M(i) of pixels per segment i. M(i) clock pulses (CLK in FIG. 9) are thus generated between the first and the second control pulse. In such a manner, each scanning module scans an equal number of pixels per unit length. The value of M(i) being obtained by:

$$M(i) = \frac{\text{length/of/the/segment}/i}{\text{pixelsize}}$$

Since the M(i) pixel clock pulses are generated during the time period between the first and the second control pulses, each scanning module only scans its own segment.

Generation of the second control pulse is necessary because not all motors of the different scanning modules rotate at exactly the same speed. By generation of the first and second control pulse, the time period $\Delta t_u$ for scanning segment u can be exactly determined, by determination of the time difference between first and second control pulse. The generation of the first control pulse further enables to check whether the first control pulse coincides with the assigned time $t_m$ of the considered segment m.

Figure 10:
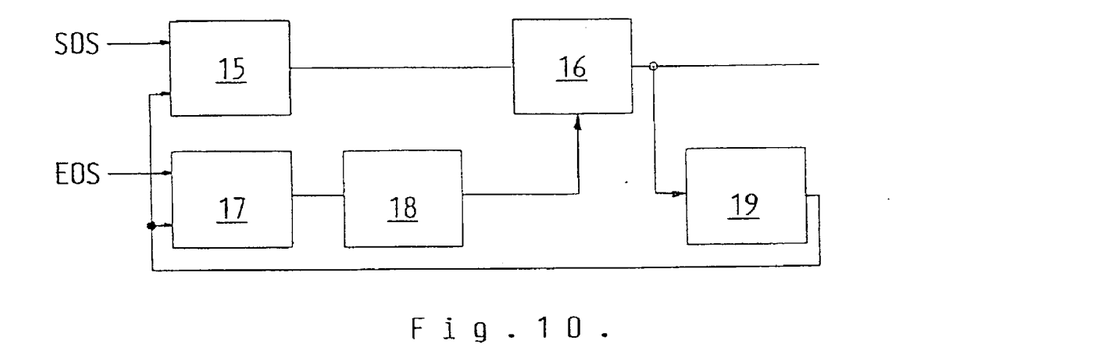
FIG. 10 shows a block scheme of an embodiment of a further control circuit as a component of the beam steering means.

FIG. 10 shows an embodiment of a further control circuit provided for generating the M(i) pixel clock pulses. The first control pulse (SOS(i)) is supplied at a set input of a flip-flop 15. An output of flip-flop 15 is connected with an input of a Voltage Controlled Oscillator 16 (VCO) which supplies, at its output, the M(i) pixel clock pulses of the pixel clock signal. The second control pulse (EOS(i)) is supplied at an input of a phase detector 17, an output of which is connected to a Low Pass Filter 18 (LPF). The output of the LPF being connected with a control input of the VCO. The clock signal output by the VCO is also supplied to a modulo M(i) counter 19 whose output is connected with a reset input of flip-flop 15 and phase detector 17.

The receipt of the first control pulse causes the flip-flop 15 to output a signal thus starting the VCO to oscillate and supply the clock pulse signal. The raising edge of the M(i)$^{th}$ pixel clock pulse causes modulo M(i) counter 19 to output the signal DIVOUT shown in FIG. 9. The raising edge of the DIVOUT signal resets flip-flop 19 which on its turn will stop the VCO 16 to oscillate.

The phase detector 17 receives the second control pulse supplied by the detector unit 6 as well as the signal DIVOUT. The phase detector measures the time difference between the raising edge of the second control pulse and the raising edge of the signal DIVOUT. If this time difference equals zero, this signifies that the pixel clock oscillates at the correct frequency and is in phase with the scanning beam. Indeed, the scanning beam has reached the end point of the segment at the same time as the M(i)$^{th}$ pixel clock pulse. If however the raising edge of the signal DIVOUT precedes or comes later then the raising edge of second control signal, then the pixel clock is not in phase with the scanning beam.

The time difference determined by the phase detector is supplied to the LPF 18 which generates a negative respectively a positive control signal when the raising edge of the signal DIVOUT precedes respectively comes later than the raising edge of the second control signal. The negative respectively positive control signal indicates that the pixel clock oscillates too quick respectively too slow. The control signal is then supplied to the VCO in order to reduce respectively increase the voltage under control of the negative respectively the positive control pulse. The control circuit shown in FIG. 10 operates thus as a closed control loop enabling to match pixel clock and scanning beam with each other.

The control circuit of FIG. 10 enables to control the individual scanning modules and takes care that the pixel clock is synchronised with the scanning beam sweep. Beside the control of each individual module, it is also necessary to have the slave scanning modules synchronised with the master. As already mentioned, the (i+1)$^{th}$ module must start its scan when the i$^{th}$ module has reached its end point. Synchronisation of the modules is now achieved by deriving a rotation index pulse from each scanning module. The rotation index pulses are fed in a motor control circuit that slaves the m$^{th}$ polygon motor to the k$^{th}$ one, with the required phase difference. In a multi-module device, preference is given to slave each head to a phase pulse derived from a master timing module. This avoids percolation of the motor control algorithm errors to the subsequent modules. In devices with lower quality requirements, this synchronisation could be accomplished by mechanically coupling the polygon rotation axes with a timing belt.

Figure 11A:
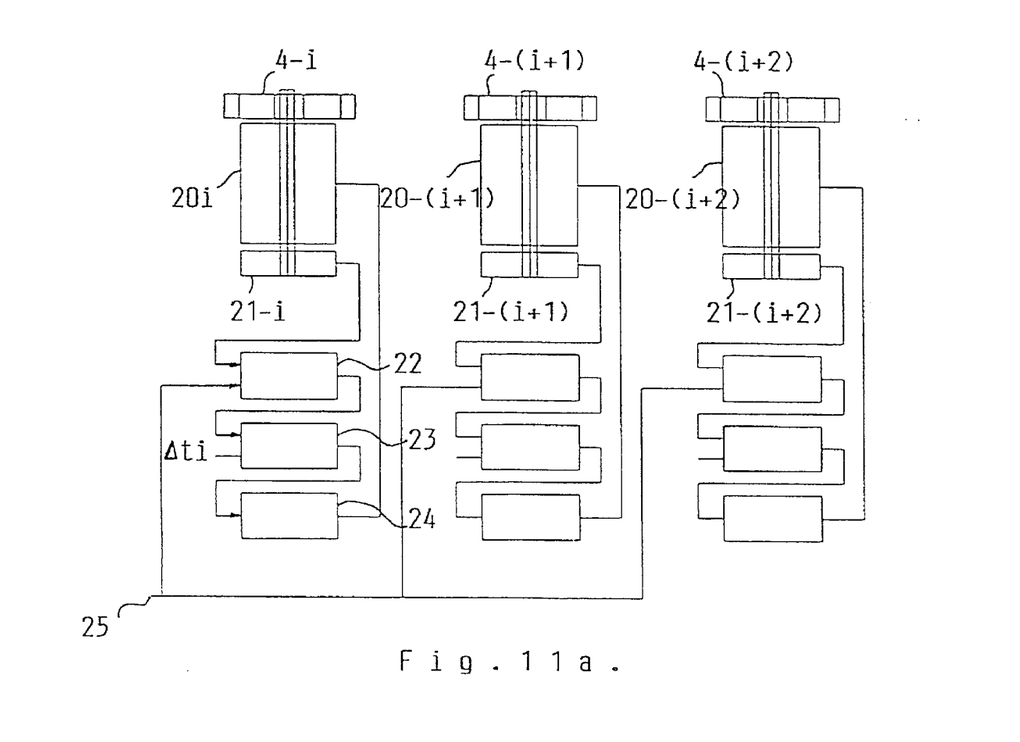
FIG. 11a shows a set-up of N=3 scanning modules with their respective drive means.

FIG. 11a shows an embodiment of a circuit enabling to synchronise the motors of the individual scanning modules with each other. Each polygon 4 is driven into rotation by its respective motor 20 provided with a pulse encoder 21. The pulse encoder 21 generates a signal which is supplied to a phase detector 22, an output of which is connected with a motor control unit 23. The control signal output by the motor control unit 23 is supplied to a motor driver 24 whose output is connected with the motor 20.

Figure 11B:
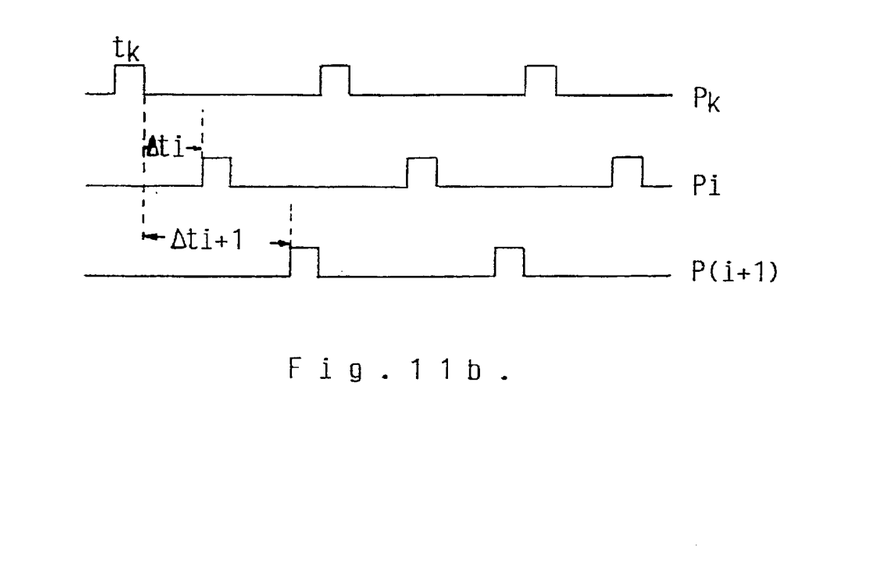

A reference signal $P_k$ originating from master k (FIG. 11b) is supplied on line 25 which is connected with a control input of each phase detector 22. The reference signal is for example formed by a clock signal supplying a clock pulse tk every 10 msec. The pulse encoder 21 supplies one pulse per revolution of the motor. The phase detector 22 determines a phase difference between the phase of the reference signal $P_k$ and the phase of the motor 20. That phase difference is then supplied to the motor control unit 23 which receives at its control input a phase set point $\Delta\psi i$. This phase set point is the phase difference between the reference signal $P_k$ and the motor pulse encoder signal $P_i$ assigned to the motor control of the scanning module i. The phase set point $\Delta\psi i$ corresponds with the time difference $\Delta t_i$ between the assigned time $t_k$ to the master scanning module and the assigned time $t_i$ to the considered scanning module i. $\Delta\psi i$ is thus the phase difference between the phase of motor k and the one of motor i enabling to synchronise time with respect to that assigned time. The motor control unit determines, on the basis of the phase difference and the phase set point, a motor steering signal in such a manner that the phase of the motor is locked with respect to the set point and the reference signal. By supplying for each motor a phase set point $\Delta\psi i$, $\Delta\psi i+1$, . . . care is taken that the motors are synchronised with each other.

Figure 12:
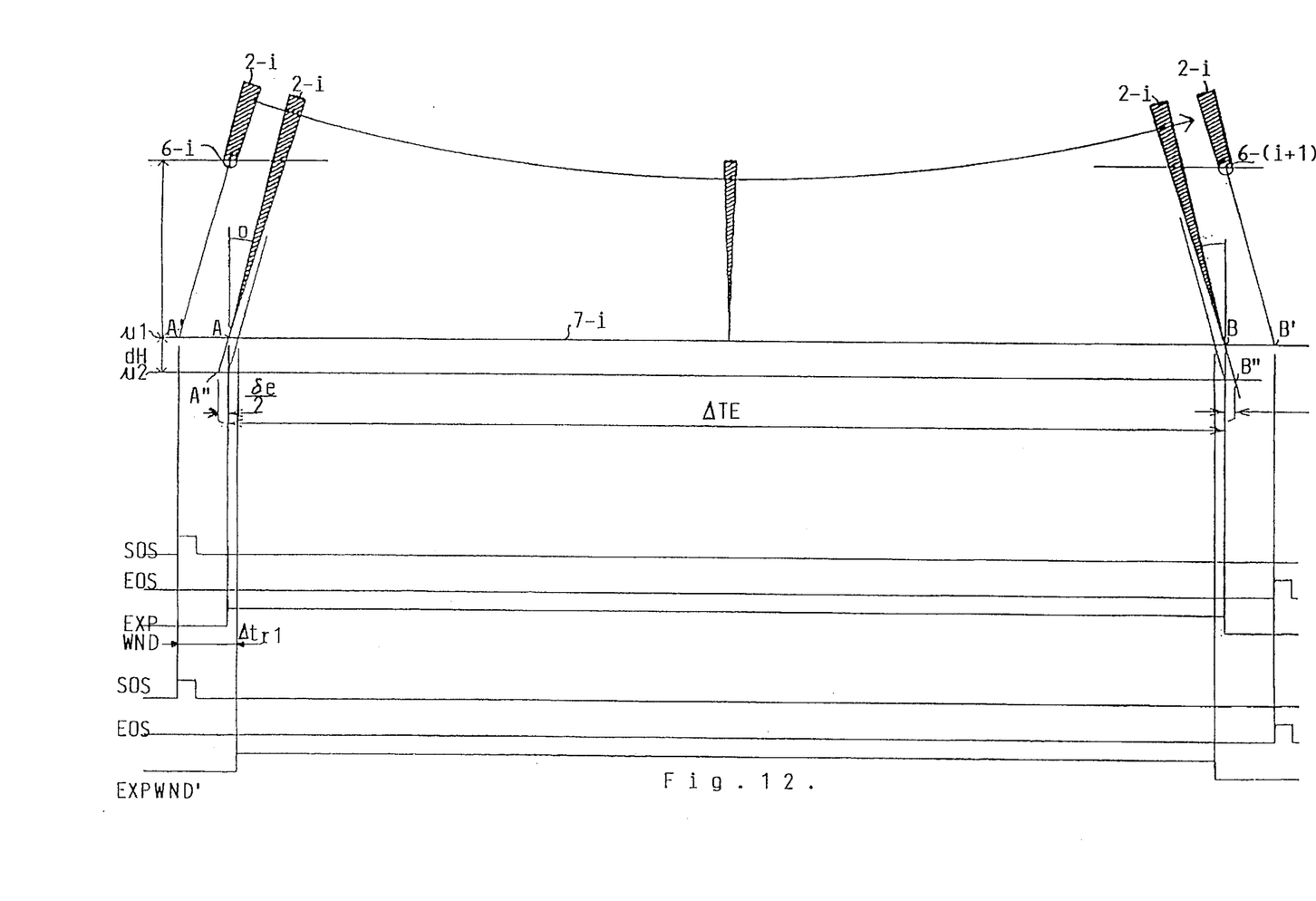
FIG. 12 illustrates the scanning operation of a single scanning module.

As already described and illustrated in FIG. 4, the detector units 6 are situated between two successive scanning modules in such a manner that the scanning beams hit the detector unit before and after having reached the starting and end points of their assigned segment. The detector units are thus situated on a further location with respect to the location of starting A and end B points of the segment to be scanned, as illustrated in FIG. 12. The detector units 6-i and 6-(i+1) are situated outside the zone A-B scanned by the beam upon scanning segment 7-i.

The positioning of the detector units at said further positions has consequences for the first and second control pulses which are used for synchronisation purposes as already described. Thereupon the scanning modules must be provided in such a manner that the scanning beam can reach the detector unit 6. Upon using polygons this is just a question of design of the lenses 8.

If the scanning beam 2-$i$, after having reached detector 6-$i$, was extended, it would correspond to a point A' on segment 7-$i$. The presence of the detector unit however prevents the light to reach point A'. In such a manner point A', which belongs to segment 7-($i$–1) and should thus be scanned by beam 2-($i$–1), is not scanned by beam 2-$i$. The light incident on detector 6-$i$ respectively 6-($i$+1) causes however the control pulse SOS respectively EOS to be generated as illustrated in FIG. 12. Since however the rotative speed of the motor is controlled and known and since the distance A'A is also known, the travel time $\Delta t_{r1}$ between A' and A is easily calculated. In order to determine the moment at which the scanning beam reaches point A, it is sufficient to delay over $\Delta t_{r1}$ the pulse SOS to generate the first control pulse.

The second control pulse is determined with the downgoing edge of the signal EXPWND (FIG. 12) of which the raising edge arises $\Delta t_{r1}$ later than the raising edge of SOS. The period $\Delta TE$ of EXPWND is determined as follows:

$$\Delta TE(i) = \frac{\text{length/of/segment/7} - i}{\text{rotative/speed/of/motor/20} - i}$$

or by dividing the distance A'B' in M equal parts and $$\Delta TE(i) = \frac{AB \times M}{A'B'}$$

The detector unit detects as well the SOS of scanning beam 2-$i$ as EOS of scanning beam 2-($i$–1) as already described. To accomplish this, the scanner optics may not be designed completely telecentric. At the outer ends of the scan segment the laser spot reaches the exposed plane at a small angle $\alpha$, of for example 4°, versus the image plane orthogonal. This non-telecentric imaging condition has the disadvantage that the in-scan length of a scan segment varies slightly when the image plane goes out of focus. The thus obtained butting error $\delta e$ is proportional to the tangent of the outer ray angle:

$$\delta e = 2\tang(\alpha)dH \qquad (1)$$

wherein dH is the height difference between a nominal plane $\mu 1$ and the actual image plane $\mu 2$. This height difference is for example due to image substrate thickness variations and imperfections in the transport system, and can reach values of dH=100 μm. With a 4° outer edge beam angle this causes 14 μm butting errors.

The distance deviation determining means which are part of the device according to the present invention are now provided for taking into account the butting error caused by this height difference or distance deviation dH. As illustrated in FIG. 5, the distance deviation determining means comprises a focused infra-red laser diode 26, the outgoing light of which is focused by means of a lens 27 on the nominal image plane $\mu 1$. The light reflected by the image plane is focused by means of a pick-up lens 28 on the plane of a Position Sensitive Diode (PSD) 29.

When the image plane corresponds to the nominalplane $\mu 1$, the reflected light of the laser diode 26 is focused on point Q1 of PSD 29. When however the actual plane $\mu 2$ is at a distance dH of the nominal plane, the shift over a height dH of the image plane causes a shift of point A towards A" (FIG. 12). The light reflected on A" reaches PSD on point Q2 situated at a distance dQ of Q1. The distance dQ now enables to determine dH. The PSD forms an electronic signal that is proportional to dQ. As PSD and $\mu 1$ are at fixed positions, dQ is proportional dH. Knowing dH and knowing $\alpha$ (=4°), $\delta e$ is obtained from expression (1).

Since the beam angle $\alpha$ at the butting location is constant, it becomes possible to combine the signals from the PSD with the one from the 4 quadrant diode to true values for the in-scan and cross-scan error values in the image plane. Knowing $\delta e$, the travel time $\Delta t_r$ is now calculated from the distance A'A+½ $\delta e$, which causes the raising edge of the signal EXPWND' (FIG. 12) to be delayed a bit more with respect to SOS. The period of EXPWND' is also shorter due to the time required to travel over $\delta e$.

In the embodiment shown in FIG. 5 the deviation determining means are mounted in front of the image plane. It would however be possible to couple those means to the medium.

I claim:

1. A scanning device comprising a scanning member provided for pathwise scanning a medium along a scanning path by means of a scanning beam, said scanning member and said medium being mutually movable with respect to each other, characterised in that said scanning member comprises a plurality of N scanning modules, each $i^{th}$ ($1 \leq i \leq N$) scanning module being each time provided for scanning its assigned $i^{th}$ segment of said scanning path and an end point of a $j^{th}$ ($1 \leq j \leq N-1$) segment corresponds with a starting point of a $(j+1)^{th}$ segment, and wherein each $i^{th}$ scanning module comprises deviation determining means provided for determining on at least one position situated along said $i^{th}$ segment a cross-scan deviation between a predetermined scanning path and the path scanned by the scanning beam, said deviation determining means being connected with scanning beam steering means provided for determining upon receipt of said cross-scan deviation a first correction signal in such a manner as to minimize said cross-scan deviation and for steering said scanning beam under control of said correction signal, and wherein said scanning beam steering means of a $k^{th}$ ($1 \leq k \leq N$) scanning module being provided for starting the scanning of its assigned $k^{th}$ segment on an assigned time $t_k$ within a scanning period $\Delta T$ for scanning the scanning path, the scanning beam steering means of each $m^{th}$ scanning module ($k \neq m$ and $1 \leq m \leq N$) being provided for starting the scanning of their assigned $m^{th}$ segment on time $$t_m = t_k + \sum_{u=k}^{m-1} \Delta t_u$$

if m>k and $$t_m = t_k - \sum_{u=m}^{k-1} \Delta t_u$$

if m<k, $\Delta t_u$ being the time period for scanning the $u^{th}$ segment.

2. A scanning device as claimed in claim 1, characterized in that said deviation determining means are provided for determining said cross-scan deviation on a first respectively a second position situated at a starting respectively at an end of said $i^{th}$ segment.

3. A scanning device as claimed in claim 1, characterized in that said deviation determining means are situated on a location situated outside a zone crossed by said scanning beam upon scanning the $i^{th}$ segment, said $i^{th}$ scanning module being provided to steer said scanning beam in order to reach said location.

4. A scanning device as claimed in claim 1, characterized in that each $i^{th}$ scanning module further comprises a detector unit provided for detecting when said scanning beam has reached said starting point of the $i^{th}$ segment and for generating a first control pulse indicating the latter, said detector unit being provided for verifying if said first control pulse coincides with said assigned time $t_i$ assigned to segment i and for determining a second correction signal upon establishing that said first control pulse does not coincide with said assigned time $t_i$, said scanning beam steering means being connected with said detector unit and further provided for steering said scanning beam under control of said second correction signal in such a manner that said first control pulse and said assigned time $t_i$ coincides.

5. A scanning device as claimed in claim 4, characterized in that said detector unit is situated on a further location situated outside a zone crossed by said scanning beam upon scanning the $i^{th}$ segment, said $i^{th}$ scanning module being provided to steer said scanning beam in order to reach said location.

6. A scanning device as claimed in claim 4, characterized in that said detector unit of each $i^{th}$ scanning module is also provided for generating a second control pulse when said scanning beam of said $i^{th}$ scanning module has reached the end point of its assigned $i^{th}$ segment, said detector unit being further provided for determining $\Delta t_{u=i}$ upon determining the time difference between said first and second control pulse.

7. A scanning device as claimed in claim 4, wherein said detector unit comprises a detector element provided for detecting when the scanning beams of said $i^{th}$ and $(i+1)^{th}$ scanning modules have reached the end point and the starting point, respectively, of said $i^{th}$ and $(i+1)^{th}$ segments.

8. A scanning device as claimed in claim 4, characterized in that said deviation determining means and/or said detector unit are coupled to said medium.

9. A scanning device as claimed in claim 1, characterized in that said deviation determining means are further provided for determining an image plane distance deviation between an actual scanning path and a nominal scanning path on said medium, said scanning beam steering means being further provided for determining upon receipt of said distance deviation a third correction signal and for steering said scanning beam under control of said third correction signal in such a manner as to compensate for said distance deviation.

10. A scanning device as claimed in claim 1, characterized in that said scanning beam steering means comprises an acousto-optical deflector provided for imposing a deflection on said scanning beam under control of said correction signal.

* * * * *